Sept. 5, 1933.  G. M. KLEUCKER  1,925,592
MEASURING APPARATUS
Original Filed June 16, 1927   3 Sheets-Sheet 1
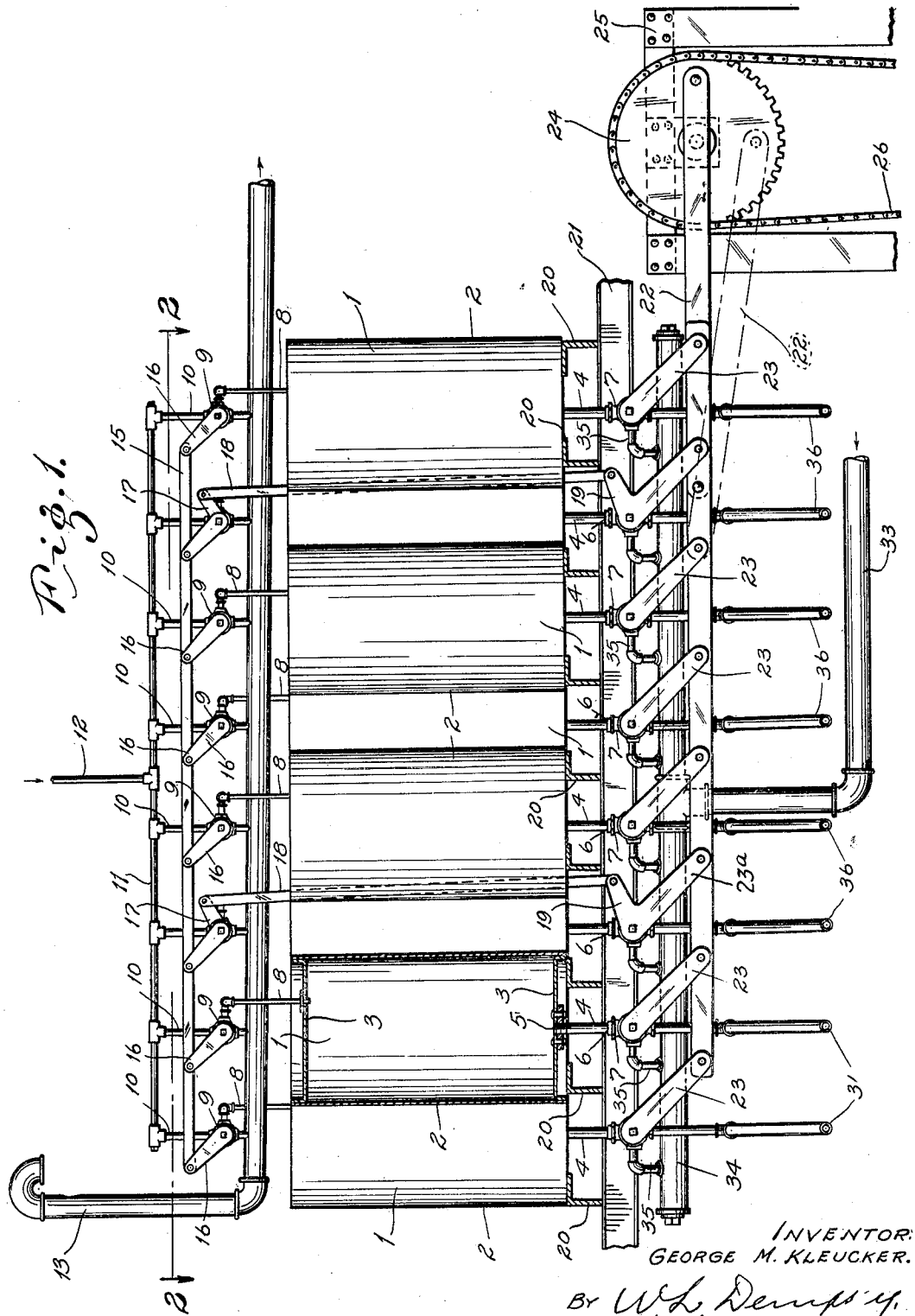
INVENTOR:
GEORGE M. KLEUCKER.
ATTORNEY.

Sept. 5, 1933.   G. M. KLEUCKER   1,925,592
MEASURING APPARATUS
Original Filed June 16, 1927   3 Sheets-Sheet 2
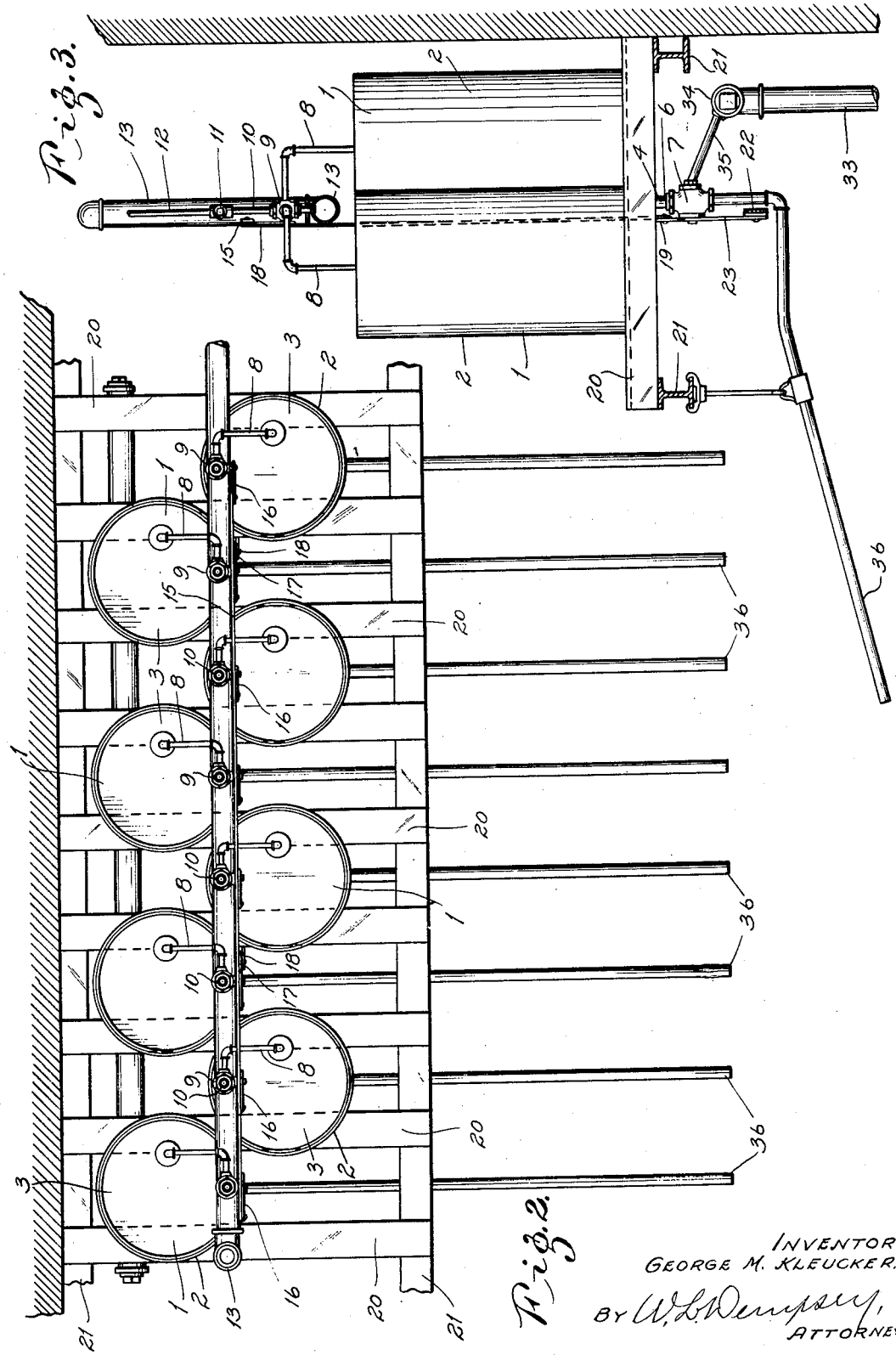
INVENTOR:
GEORGE M. KLEUCKER.
By W. L. Dempsey,
ATTORNEY Sept. 5, 1933.  G. M. KLEUCKER  1,925,592
MEASURING APPARATUS
Original Filed June 16, 1927  3 Sheets-Sheet 3
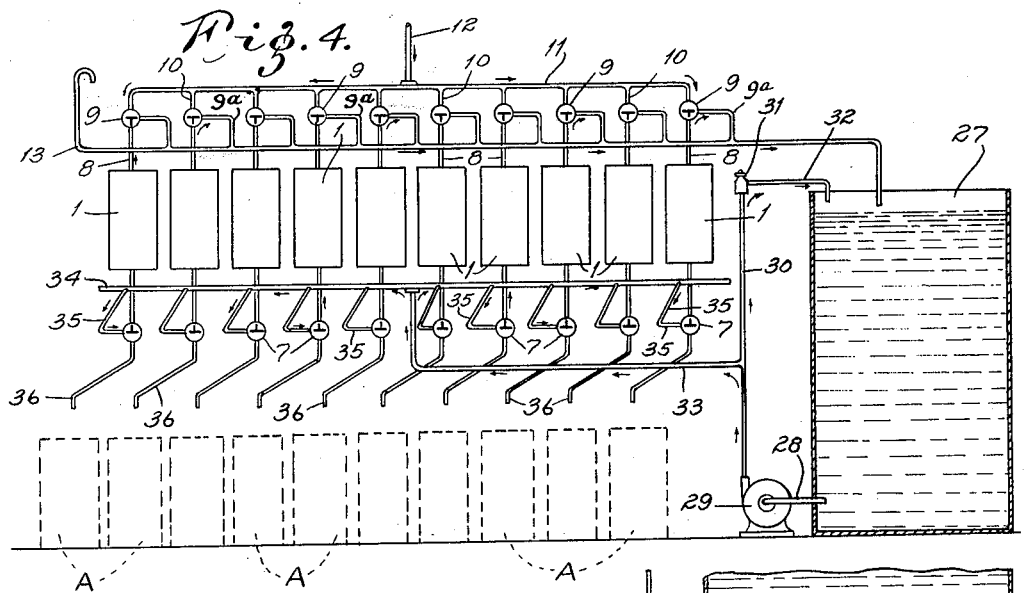
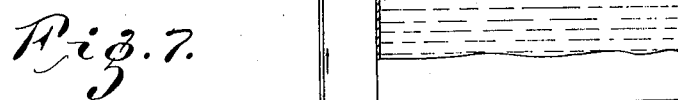
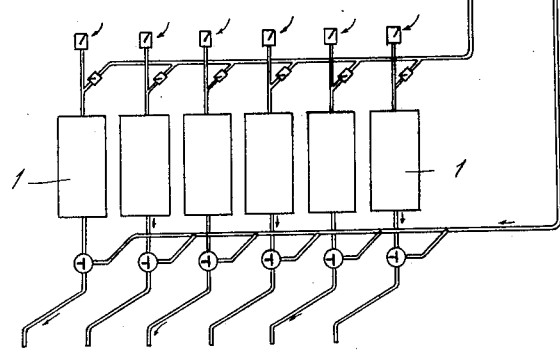
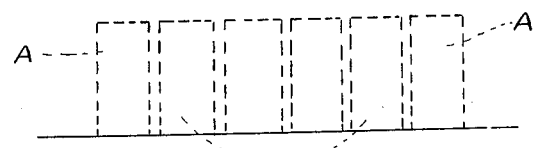
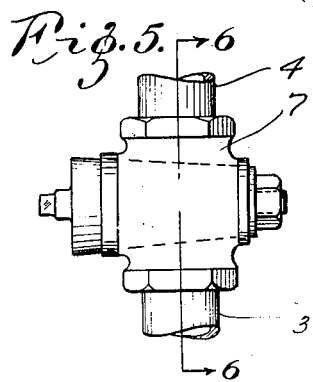
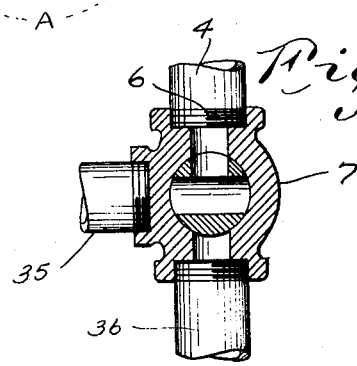
INVENTOR:
GEORGE M. KLEUCKER
By W. L. Dempsey,
ATTORNEY Patented Sept. 5, 1933

1,925,592

UNITED STATES PATENT OFFICE 1,925,592

MEASURING APPARATUS

George M. Kleucker, St. Louis, Mo.

Application June 16, 1927, Serial No. 199,272
Renewed January 26, 1933

1 Claim. (Cl. 226—105)

My invention relates to measuring apparatus, and more specifically to enclosed measuring devices especially adapted to measuring water to be frozen in ice plants.

The primary object of my invention is to provide an apparatus that will automatically and accurately measure and discharge a predetermined quantity of water into one or more ice cans.

Another object of my invention is to provide measuring cans of the closed type in which the water to be measured can be kept in constant circulation.

Another object of my invention is to provide a plurality of measuring cans so disposed relative to each other and to ice cans that they will occupy a minimum amount of space.

Other objects and advantages of my invention will be apparent in the specification, claim and drawings in which:—

Fig. 1 is a side elevation, partly in section, of a unit of my improved measuring apparatus.

Fig. 2 is a plan view of my invention along the line 2—2 in Fig. 1.

Fig. 3 is an end elevation of my invention, looking toward the left as in Figs. 1 and 2.

Fig. 4 is a graphical illustration of the system installed.

Fig. 5 is a perspective of a 3-way valve used in my system.

Fig. 6 is a cross section along the line 6—6 in Fig. 5.

Fig. 7 is a graphical representation of a modified form of my invention.

In the manufacture of ice it is very desirable that the cakes be of uniform size and weight, and it is the usual practice to manufacture ice in cakes weighing 300 and 400 pounds. In order to take care of meltage, there is usually an allowance of from 10 to 20 pounds extra weight for each cake of ice.

While the ice cans into which the water is discharged to be frozen are of uniform size, it is readily understood that in a can large enough to hold 300 pounds of water the slightest difference in the height of the water in the can would result in considerable over-weight or under-weight of the blocks of ice. It is common practice to fill the cans approximately full, and then determine the height of the water in the cans by various gauges and other devices. The water is then dipped from the cans that seem to be over-filled and poured into the cans that seem to be under-filled, so that at best only a fairly good average is maintained when the operator uses extreme care; while, on the other hand, carelessness or indifference on the part of the operator results in a great lack of uniformity in the size and weight of the blocks of ice.

In addition thereto, this method results in a considerable loss of time and expense.

The rapid increase in the population of cities and towns is making conservation of space in manufacturing plants of paramount importance. It is, therefore, important that any additional equipment should be so constructed as to occupy a minimum of space, and at the same time be so disposed as to result in maximum efficiency and economy.

To attain these results, I have designed a system, graphically shown in Fig. 4, in which a plurality of measuring cans are disposed in a horizontal plane above the ice cans to be filled, thereby leaving ample space for the operators to remove the blocks of ice.

To still further conserve space, I have shown in my preferred method the measuring cans disposed in staggered relation to each other, so that the discharge pipes from the measuring cans into the ice cans may be disposed in short straight lines.

It is obvious that space might be conserved by making the cans rectangular or oval. This method, however, would greatly increase the manufacturing cost.

The disposition of the measuring cans with reference to the ice cans will be readily understood by referring to the graphical illustrations in Figs. 4 and 7, which show the water supply tanks directly adjacent the measuring cans and brine tanks.

The advantage of having the measuring cans of the closed type is to keep the water to be frozen free from dust and dirt, and has the further advantage that the water can be kept in constant circulation, as will be evident from the detailed description to follow.

In Fig. 1, I have illustrated my preferred method of construction, which may be varied to suit individual installations, and could be positioned at any convenient place either in the tank room or entirely without the room for the reason that in my preferred method the water to be measured and discharged is at all times under pressure.

I have provided a plurality of measuring cans 1, which may be increased or decreased in number and size to suit the requirements of the plant in which they are to be installed.

These cans are preferably made cylindrical in form and consist of an outer shell 2 and suitable heads 3, with an outlet pipe 4 in open communication at its upper end 5 with the interior of the can and its lower end 6 in open communication with a 3-way valve 7.

The upper end of the can 1 is in intermittent communication by means of the pipe 8, valve 9 and pipe 10 with the header 11, which in turn is in communication by means of the pipe 12 with a source of air supply under pressure.

The valves 9 are in open communication with a vent pipe 13, the function of which will be later described. The valves 9 are synchronously operated with the valves 7, later described, by means of the shifting bar 15, and the crank-arms 16 and 17, which in turn are operatively connected by the link bars 18 to the bell cranks 19.

The measuring cans 1 are suitably supported by means of angle or other suitable cross beams 20 resting upon longitudinally disposed I-beams 21 at any suitable or convenient place where they may be operatively connected with the ice cans A, as designated by A and indicated by the dotted lines in Figs. 4 and 7.

The longer ends 23a of the bell cranks 19 are operatively connected with the shifting bar 22, while the shorter ends of the bell cranks 19 are connected with the link bars 18 for the purpose of operating the valves 9 and 7 simultaneously. In addition to the bell cranks 19, all of the other valves 7 are operatively connected with the shift bar 22 by links 23.

As the measuring cans are usually elevated at a considerable height above the ice cans, a sprocket wheel 24 is rotatably mounted upon a suitable frame 25 and rotatably connected to the shifting bar 22, and is provided with a sprocket chain 26 connected to another sprocket wheel, not shown, so that all the valves may be operated simultaneously either manually or by power.

The 3-way valve shown in Figs. 5 and 6 is simply illustrative of my system and is not claimed as new.

Referring now to the graphical representation in Fig. 4, a source of water supply is provided, consisting preferably of a storage tank 27, having an outlet 28 connected to a pump 29, preferably of the rotary or centrifugal type. The outlet from the pump consists of a vertical riser 30 provided with a relief valve 31, which in turn is connected by the discharge pipe 32 to the storage tank 27.

When the pump 29 is in operation, a pressure is built up in the line 30 which causes the water to flow through the main supply pipe 33 into the header 34, shown with closed ends in Fig. 1. From the header 34, through the laterals 35, the water is conducted into the valves 7.

Through the valves 7 the water may be caused to flow from the measuring cans 1 through the discharge pipes 36 into all of the ice cans A. This, of course, would only occur when the cans 1 are already filled. After filling the cans A, the water is taken from the reservoir 27 through the pipe 28 and forced by the pump 29 up through the line 30, the relief valve 31 being set at a pressure sufficient to drive the water through the pipe 33 into the header 34, through the laterals 35 through the valves 7 which have been set so as to discharge the water into the measuring cans 1.

When the measuring cans 1 become filled, the water is forced upwardly through the valves 9 which have been set in a manner to cause the water to be discharged through the laterals 10 into the header 13, through which it returns to the tank 27, thereby providing for circulation of the water through the measuring cans 1.

Should the valves 9 be set to permit inflow of air under pressure through the pipe 12, from any convenient source, not shown, the valves 7 would at the same time be opened so as to discharge the water from the measuring cans 1 into the ice cans A.

It is evident that when the valves 9 are open for discharging water, they are closed against water flowing in through the header 34. In that case sufficient pressure must be built up by the pump in the line 30 to open the valve 31 and cause the water to be redischarged through the pipe 32 into the reservoir 27.

The valves 9 serve the dual purpose of admitting air under pressure into the measuring cans 1 to facilitate the discharge of the water and for the further purpose of permitting the water to be pumped through the measuring cans 1 and redischarged into the reservoir 27 for the purpose of keeping the water in circulation, it being understood that the valves 9 are closed against entrance of air through the pipe 12, header 11 and laterals 10.

When the valves 9 are turned in a position to discharge water into the ice cans A, the valves 7 are opened, which automatically puts the water under pressure greater than atmosphere, thereby increasing the velocity of flow of the water, so that the cans are simultaneously emptied of water and filled with air. When the valves 7 are turned to a position to fill the cans with water, the valves 9 are closed to prevent inflow of air through 12, 11 and 10, and open so as to discharge the compressed air through the manifold 13 and laterals 9a.

The object of introducing air under pressure is for the purpose of more quickly discharging the water from the measuring cans into the ice cans.

In Fig. 7, I have graphically shown a modified form of my measuring apparatus, the only difference being that the system shown in Fig. 4 is under pressure greater than the atmosphere, while the system illustrated in Fig. 7 is operated by a static head and standard air pressure. The modification is clearly shown in the graph in Fig. 7 by the valve setting and arrows.

Having fully described my invention, what I claim as new and useful and desire to protect by Letters Patent is:—

A measuring apparatus for filling ice cans, of the class described, comprising in combination, a plurality of containers of equal capacity vertically disposed in rows in staggered relation to each other, headers disposed at right angles to the major axes of said containers at both ends of said containers, laterals connecting said headers and said containers in open communication with each other, three-way valves disposed in said laterals, means for operating all of said valves simultaneously in three positions, one of said positions causing all of said containers to be simultaneously filled with a liquid flowing through one of said headers, another of said positions of said valves causing all of said containers to be simultaneously discharged and the inflow of liquid into said containers to simultaneously stop, and the third of said positions of said valves simultaneously putting all of said containers into open communication with each other and also into open communication with a source of liquid supply, thereby causing a continuous circulation of liquid through all of said containers when said containers are not being discharged or filled.

GEORGE M. KLEUCKER.